H. O. BRION.
AUTOMATIC ADVERTISING APPARATUS.
APPLICATION FILED JUNE 18, 1912.
1,059,110.
Patented Apr. 15, 1913.
5 SHEETS—SHEET 2.
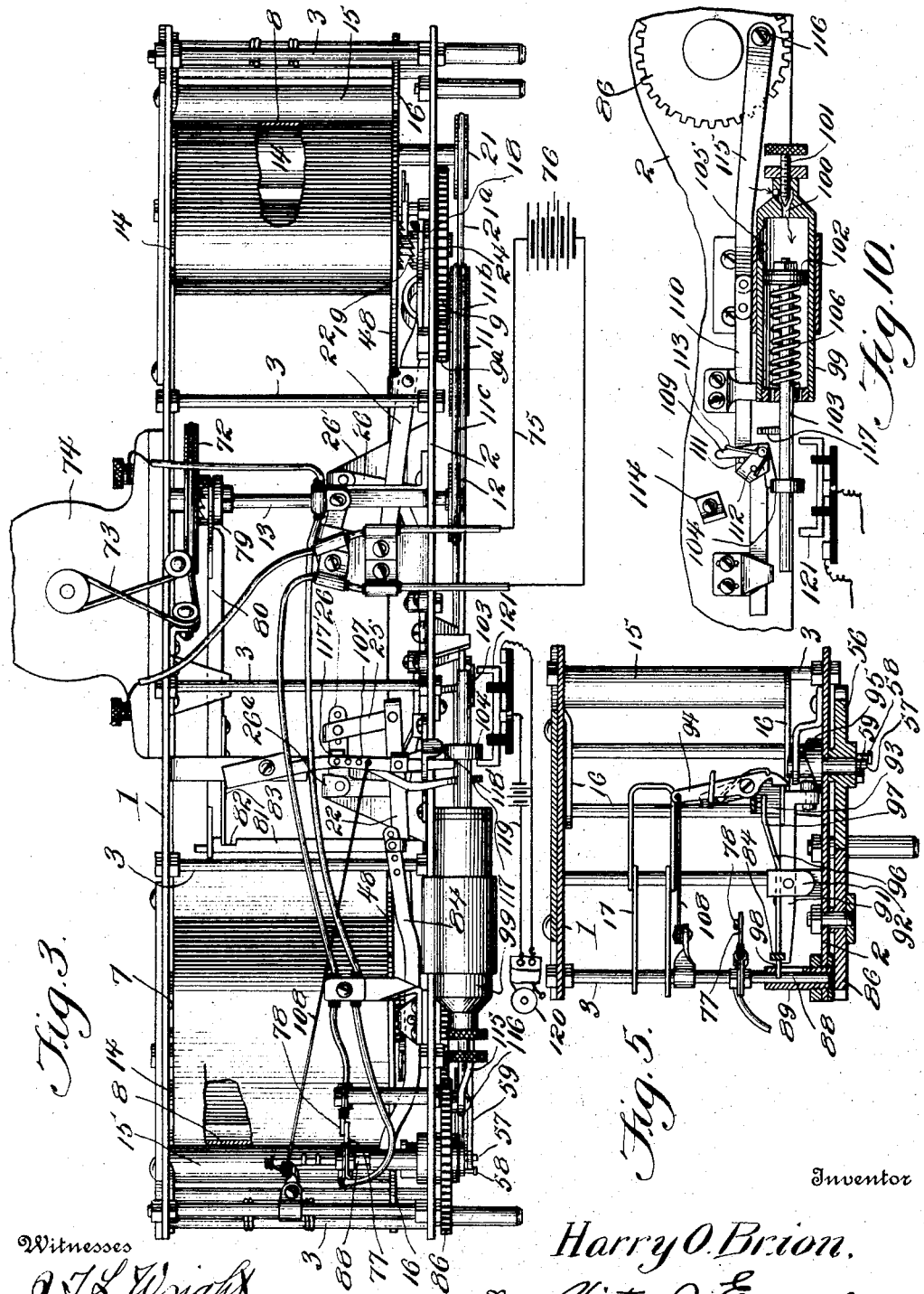
Witnesses
G. J. L. Wright.
C. A. Hines.
Inventor
Harry O. Brion.
By Victor J. Evans
Attorney

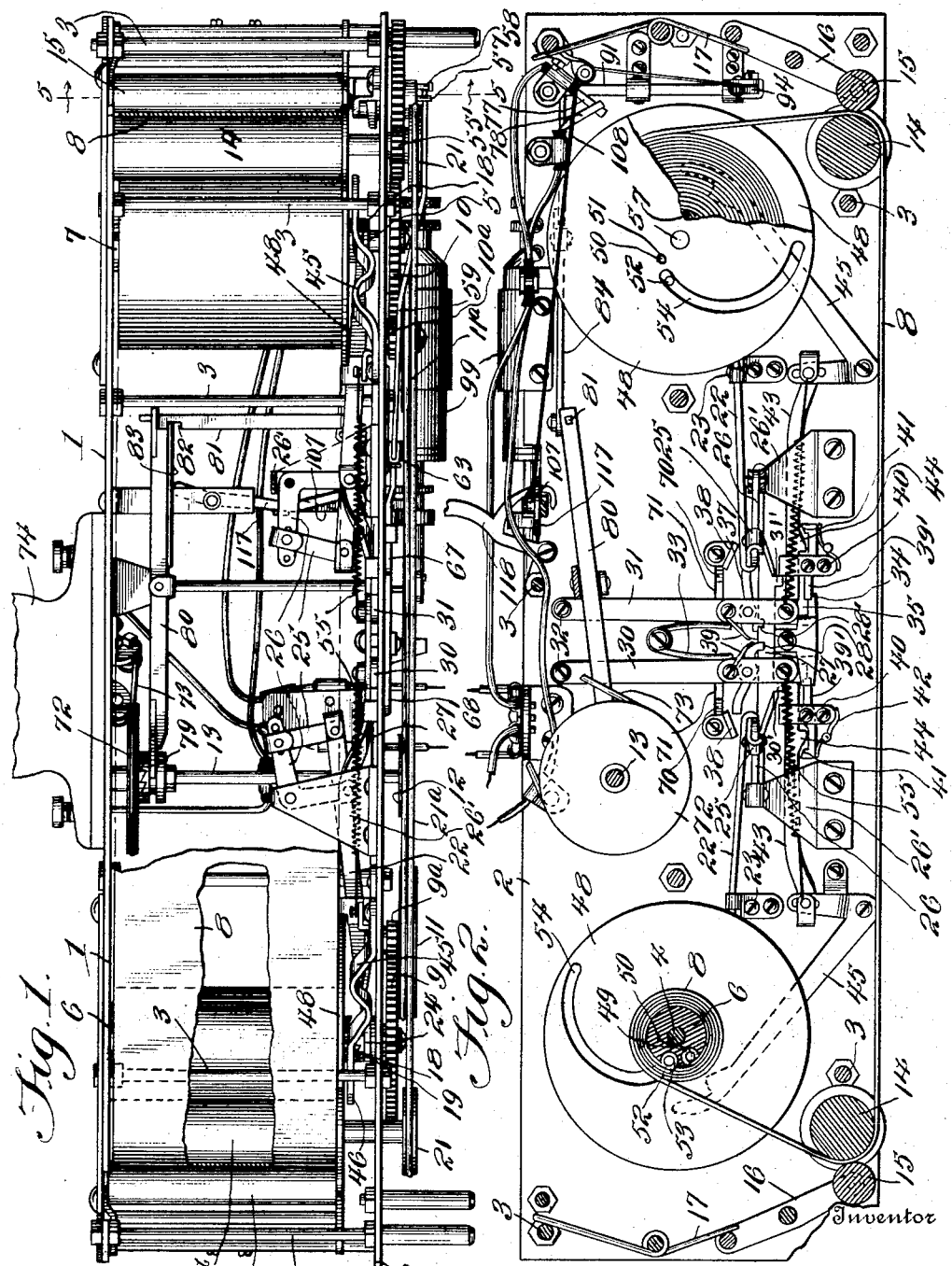

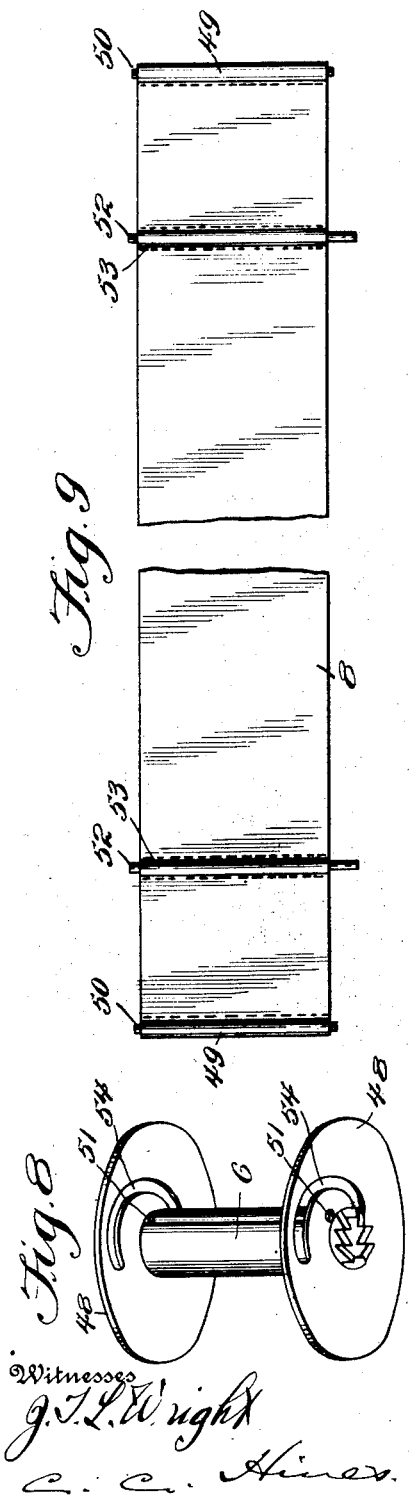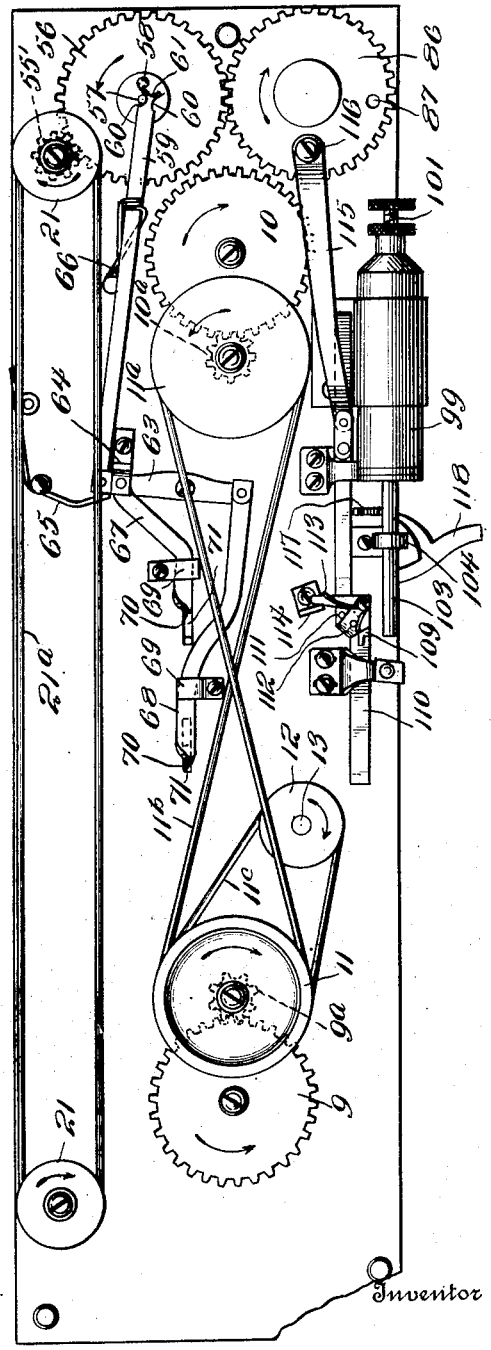

H. O. BRION.
AUTOMATIC ADVERTISING APPARATUS.
APPLICATION FILED JUNE 18, 1912.
1,059,110.
Patented Apr. 15, 1913.
5 SHEETS—SHEET 4.
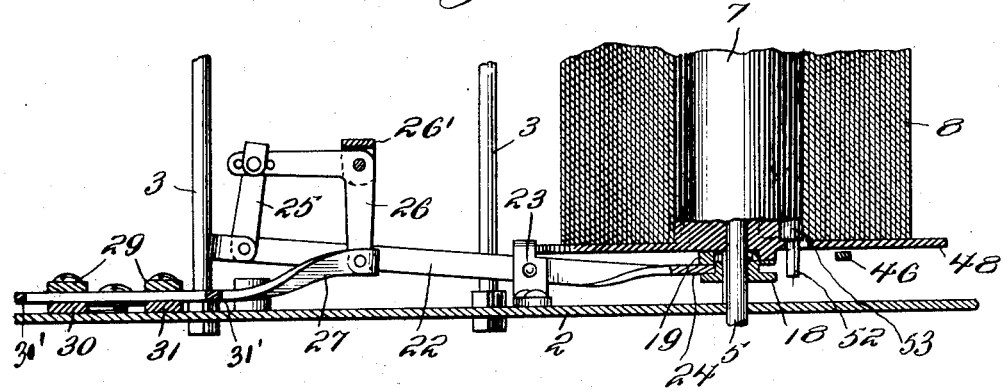
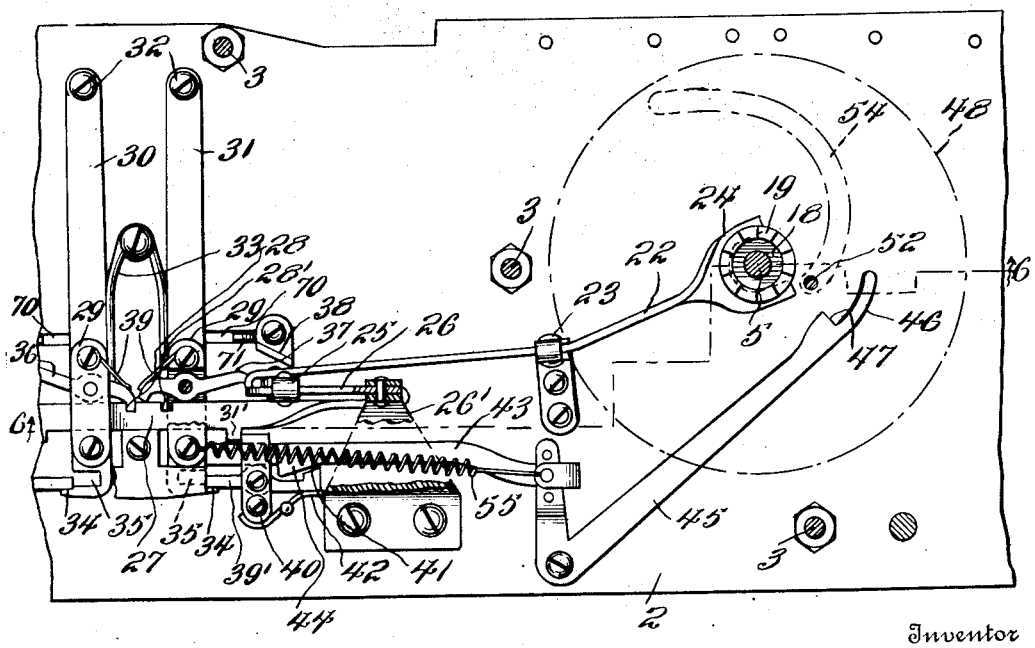
Witnesses
J. L. Wright
C. C. Hiner
Inventor
Harry O Brion,
By Victor J. Evans
Attorney H. O. BRION.
AUTOMATIC ADVERTISING APPARATUS.
APPLICATION FILED JUNE 18, 1912.
1,059,110.
Patented Apr. 15, 1913.
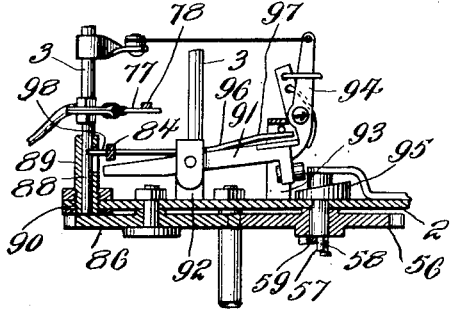
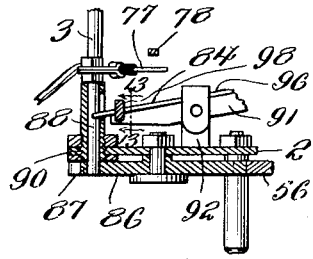
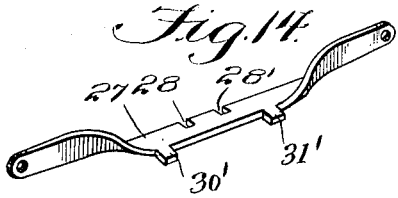
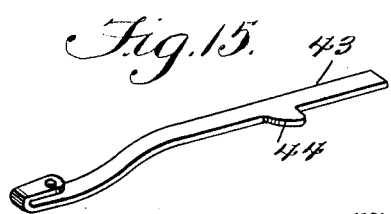
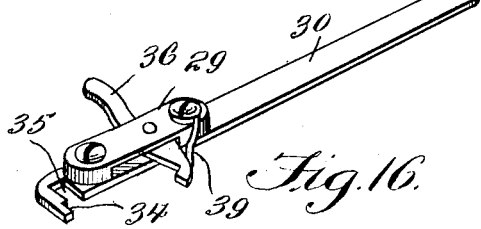
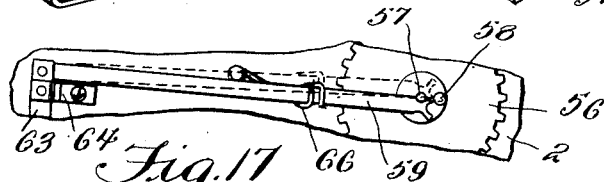
Inventor
Harry O. Brion
By Victor J. Evans
Attorney
Witnesses

UNITED STATES PATENT OFFICE.

HARRY O. BRION, OF GATES, NEW YORK.

AUTOMATIC ADVERTISING APPARATUS.

1,059,110.  Specification of Letters Patent.  Patented Apr. 15, 1913.

Application filed June 18, 1912. Serial No. 704,389.

*To all whom it may concern:*

Be it known that I, HARRY O. BRION, a citizen of the United States, residing at Gates, in the county of Monroe and State of New York, have invented new and useful Improvements in Automatic Advertising Apparatus, of which the following is a specification.

This invention relates to an automatic advertising apparatus designed especially for street, show-window and other advertising and for successively displaying a series of advertisements. While the invention is particularly useful in this connection, it is not necessarily limited to this class of service, but may be used on street or railway cars for street or station indicating and other purposes.

The invention has for one of its objects to improve and simplify the construction and operation of devices of this character so as to be comparatively simple and inexpensive of construction, reliable and efficient in action, and automatic in its operation for disclosing the successive signs or advertising matter.

Another object of the invention is the provision of novel winding means for the sign-bearing element, in connection with mechanism for automatically reversing the direction of movement of the said element, so that in one direction of movement of the sign-bearing element the signs will be disclosed in successive order and on the reverse direction of movement of said element the signs will be disclosed in the reverse order.

With these and other objects in view, as will appear as the description proceeds, the invention consists of the novel features of construction, combination and arrangement of parts, hereinafter fully described and claimed, reference being had to the accompanying drawings, in which:—

Figure 1 is a front elevation, partially in vertical longitudinal section of the apparatus. Fig. 2 is a longitudinal horizontal section of the apparatus taken on a line immediately below the top plate of the frame. Fig. 3 is a rear elevation of the apparatus. Fig. 4 is a bottom plan view. Fig. 5 is a vertical transverse section on line 5—5 of Fig. 1. Fig. 6 is an enlarged vertical sectional view of the parts of the clutch-shifting or reversing device associated with one of the winding rolls or spools. Fig. 7 is an enlarged sectional plan view of the same. Fig. 8 is a perspective view of one of the spools. Fig. 9 is a plan view of the sign-bearing element partly broken away. Fig. 10 is a fragmentary bottom plan view of the parts of the timing mechanism, the air cylinder thereof appearing in section. Figs. 11 and 12 are detail sections similar to Fig. 5 showing the parts of the starting and stopping mechanism in different positions. Figs. 13 to 17, inclusive, are detail views of parts of the apparatus.

Similar reference characters are employed to designate corresponding parts throughout the views.

Referring to the drawings, 1 and 2 designate the top and bottom plates of the frame that are connected together by posts 3 arranged at suitable points, the frame being inclosed in a casing of any suitable construction, if desired. At opposite ends of the frame are vertical spindles 4 and 5 on which are loosely arranged spools 6 and 7, one spool being operatively connected at a time with its spindle or shaft to turn therewith, while the other freely turns on its spindle or shaft to permit the sign-bearing element 8 to unwind from the latter and wind on the former spool. The lower ends of the shafts 4 and 5 carry gear wheels 9 and 10 which are in mesh through pinions $9^a$ and $10^a$ with drive pulleys 11 and $11^a$. The pulley 11 is a double-grooved pulley, and passing around said pulleys is a crossed belt $11^b$, so that both spindles or shafts will be simultaneously rotated but in opposite directions. Also passing around the pulley 11 is a belt $11^c$, which passes around a motor-driven pulley 12, arranged upon the lower end of a motor-driven shaft 13. Adjacent each end of the frame or casing is a vertical guide roll 14 around which the sign-bearing element or ribbon 8 passes, and said element or ribbon is pressed into frictional engagement with guide rolls 14 by idler rolls 15 mounted on winding frames 16 provided with springs 17 for pressing the idler rolls against the element passing over the guide rolls.

On each shaft or spindle is feathered a clutch element in the form of a sleeve 18 that has teeth 19 adapted to engage with teeth or recesses on the adjacent spool 6 or 7. One clutch element 18 is adapted to be held raised in engagement with the spool thereover, while the other clutch element is lowered out of engagement with its respective spool, so that only one spool is positively driven for winding the sign-bearing ribbon thereon, while the other spool is free to turn on its spindle or shaft. The shafts of the guide rolls 14 carry grooved pulleys 21 connected by a belt 21ª, whereby said rolls are connected to turn at a uniform rate of speed. The mechanism for shifting or opening the clutches includes a clutch lever 22 extending under each spool. The lever is intermediately pivoted, as at 23, to swing in a vertical plane, and its end projecting beneath the spool is formed with a yoke 24 to receive the clutch element 18, the latter being formed with a peripheral groove through which the lever engages so that the clutch element can freely rotate and yet be raised and lowered on its shaft. The free ends of the levers 22 are connected by links 25 with the normally horizontal arms of bell crank levers 26 fulcrumed upon brackets 26', the vertical arms of which bell crank levers are pivotally connected with the opposite ends of a sliding shifting bar 27 provided in one of its longitudinal edges with spaced notches 28 and 28'.

The bar 27 is mounted to slide through transverse guides 29 in a pair of laterally swinging shifting levers 30 and 31 and is provided with stop lugs 30' and 31' to engage the respective levers, whereby the sliding movements of the bar in opposite directions are limited. The bars 30 and 31 are pivoted at one end, as at 32, and adapted to be independently pressed outward by the independently movable arms of a V-shaped spring 33. The free ends of the bars are formed with locking notches 34 and recesses 35 adjacent thereto, and pivoted latches 36 and 37 are mounted upon the bars and provided with toothed inner arms for engagement with the notches 28 and 28' and outwardly extending trip arms adapted to engage the beveled or inclined surfaces of trip members 38, whereby the latches are adapted to be retracted against the pressure of springs 39 and released from engagement with the notches. On the outward swinging movement of either lever 30 or 31 sliding motion in the direction of movement of said lever is imparted to the bar 27 until the acting latch 36 or 37 is released from engagement therewith, whereby motion is communicated to one of the bell crank levers 26 to shift the associated clutch lever 22 to clutch releasing position while at the same time motion is communicated to the other clutch lever 22 to shift the same to clutch projecting position. The levers 30 and 31 are adapted to be held from outward movement by latches 39' fulcrumed upon brackets 40 and having inner arms to engage the notched portions 34 of the levers and outer arms provided with cam surfaces 41 and normally held pressed by springs 42 to hold the latches in retaining position.

Associated with the latches 39' are sliding releasing bars 43 each provided with a cam surface 44 and pivoted at its outer end to the short arm of a bell crank controlling lever 45 the long arm of which is provided with a hooked end 46 projecting under the adjacent spool and terminating at its inner end in a stop shoulder 47. Each spool is provided with top and bottom flanges 48 spaced a sufficient distance to permit the sign-bearing element or ribbon 8 to wind between them, and each end of the ribbon is formed with an open seam or loop 49 through which fastening wires 50 are passed, the ends of the wires being engaged in openings 51 in the flanges 48. At a short distance inwardly from each end, the ribbon is provided with transverse wires or rods 52 fastened to the ribbon in any suitable manner, as for instance by being held in hems 53, and the ends of these wires pass through spiral slots 54 in the flanges 48 of the spool. The lower ends of the wires project below the lower flanges so as to act for tripping the controlling levers 45 for transmitting motion to the releasing slides 43. When the ribbon is unwound so that the end is reached, the rod 52 at such end will be drawn outwardly toward the periphery of the spool, and in so doing will engage the hooked end 46 of the lever 45 and swing said lever outwardly to shift the coacting slide 43. When the rod 52 reaches the limit of its outward movement it begins to move back on the rewinding motion, leaving the slide 43 and lever 45 to be retracted by the resetting mechanism. A spring 55 operates to normally hold the slide 43 against levers 30 and 31 and to operate said slide and levers in the resetting action.

Assuming that both clutches are in released position and the left-hand latch 37 is in engagement with the notch 28, in which position of the parts the right-hand lever 37 is out of engagement with both of the notches 28 and 28', it will be understood that when the slide 43 is drawn outwardly its cam surface 44 will engage the cam surface 41 of the coacting latch member 39' and retract said latch, permitting the lever 30 to be shifted laterally by the spring 33, whereby motion in the same direction will be transmitted to the bar 27 until the latch 37 above mentioned is retracted by the coacting cam block 38, at which time the right-hand latch member 37 will engage the notch 28' and lock the bar 27 in shifted position. When the left-hand latch member 39 is tilted as above described its inner arm moves out of engagement with the notch 34 and into alinement with the recess 35, permitting outward movement of the lever 30 as above described, and as a result of such shifting movement of said lever motion is communicated to the cooperating bell crank lever 26 to operate the left-hand clutch lever 22 to move the associated clutch member 18 into engagement with the spool 9 to fix the latter to its spindle 4 to wind up the sign-bearing element 8. When the ribbon or sign-bearing element has been unwound fully from the spool 10, the rod 52 carried thereby engages and operates the coacting controlling lever 45 and shifts the opposite releasing rod 43 for adjustment of the lever 31 to throw the clutch member 18 of the spool 9 out of action and at the same time throw the corresponding clutch member of the spool 10 into action for the reversal and rewinding of the ribbon upon the spool 10. This arrangement of the mechanism leaves the shifted shifting lever free to be reset and locks the other shifting lever against movement until positively released for action by its controller.

The shaft of one of the rolls 14 carries a pinion 55′ meshing with a reversing gear 56, which gear carries a stop pin 57 and a resetting pin 58. These pins are adapted for coaction with the free ends of a resetting bar 59, having opposite side notches 60 for coaction with the pin 57 and an end notch 61 for coaction with the pin 58. The opposite end of the bar 59 is pivoted to swing laterally, as at 62, to one end of an intermediately pivoted transmitting lever 63, which is held pressed normally against a stop 64 by a spring 65, which also operates to hold the bar in normal position, a spring 66 acting to control the lateral movements of said bar and to maintain one of its notched portions 60 in engagement with the pin 57. To the respective ends of the lever 63 are pivotally attached the adjacent ends of resetting slides 67 and 68 which are movable in suitable guides 69 and have their free ends bent to provide fingers 70 extending upwardly through slots 71 in the plate 2 and arranged to engage the respective levers 30 and 31, so that when the resetting bar 59 is engaged and moved longitudinally by the pin 58 the resetting slides will be reversely adjusted and will reset the lever 30 or 31 which is in position to be reset or restored to normal position.

The shaft 13 carries a loose pulley 72 driven by a belt 73 from an electric motor 74 arranged in a circuit 75 having a suitable source of energy, as a battery 76, and provided with relatively movable contacts 77 and 78 whereby said circuit may be periodically opened and closed. The pulley 72 is provided with clutch teeth for engagement with the teeth of a clutch member 79 feathered to the shaft and annularly grooved to receive the forked end of an adjusting lever 80 which is pivoted for vertical movement and has its opposite end slotted and slidably connected with a link 81 formed with a notch 82 to receive a spring 83, by which it is slidably and resiliently connected with said lever. The lower end of the link is pivoted to one end of an operating lever 84, the opposite end of which is notched, as at 85, for coöperation with the parts of a starting and stopping mechanism.

The starting and stopping mechanism comprises a gear 86 which meshes with and is driven from the reversing gear and is provided with an opening 87 to receive a locking pin 88 movable in a guide 89 and through an opening 90 in the plate 2, which pin operates the movable switch contact 77. A controlling lever 91 is pivoted intermediately to a support 92 and has one of its ends movable in a suitable guide 93 and adapted to be elevated into locking engagement with a latch 94 by a cam 95 indirectly actuated as hereinafter described by the gear 86. Secured centrally to the lever 91 is a leaf spring 96, one end 97 of which is adapted to be tensioned by contact with the guide 93 upon such upward movement of said end of the lever and to depress such end of the lever downward when released by the cam and latch. The other end 98 of the spring engages the notched end 85 of the lever 84 and a notch in the locking pin 88 and is adapted to be tensioned when the locking end of the control lever is raised to force the pin downward when the lever is released by the latch and the opening in the gear 86 comes into alinement therewith. On the downward or locking movement of the pin the gearing is fixed from motion to stop the operation of the sign mechanism, in which position the latch is in engagement with the controlling lever and the end 97 of the spring is tensioned for subsequent releasing movement. In such position of the parts the circuit is also broken and the clutch member 79 thrown out of engagement with the pulley 72. The latch device 94 may be retracted by hand to throw the parts into action, and it will be observed that when the parts are in operation one complete movement of the gear 86 is permitted before the pin 88 again locks the parts from motion, during which interval of operation the ribbon will be moved to bring a sign into position and then held from movement to display the sign for a desired period. It is, however, preferred to employ an automatic mechanism for timing the starting and stopping mechanism and throwing the same into and out of operation and whereby the signs may be intermittently moved to display position and displayed for a desired period of time.

The timing mechanism comprises a cylinder 99 having at one end an air inlet and discharge port 100 controlled by a valve 101, and in which cylinder operates a piston 102 having a stem 103 slidable through the opposite end of the cylinder and carrying a collar or enlargement 104. Adjacent its admission end the cylinder is provided with a duct 105 to permit air to pass to both sides of the piston for an equalization of pressures when the piston is fully retracted. Arranged between the piston and outer end of the cylinder and surrounding the stem is a coiled motor spring 106. The lower end of a trip lever 107 is arranged in the path of inward movement of the collar 104 and a flexible connection 108 couples said lever with the latch 94, whereby said latch is adapted to be automatically released for the projection of the locking pin. The collar 104 is normally engaged by the notched end of a pivoted actuating lever 109 mounted upon a sliding bar 110 and limited in motion by stop pins 111 and 112. A spring 113 is provided to normally hold said lever in collar engaging position and permit it to have limited swinging motions in opposite directions. The opposite arm of the lever is adapted to engage a trip lug 114, whereby the lever is retracted from engagement with the collar. A pitman or connecting rod 115 couples the bar 110 to a crank pin 116 on the gear 86, by which the bar 110 is given a reciprocating back and forth motion on each revolution of the gear. The forward motion of the bar 110, through the engagement of the latch 109 with the collar 104, moves the stem 103 outwardly until said stem is released by the engagement of the latch 109 with the trip member 114 which occurs at or about the time the locking pin is projected to stop the operation of the gearing for display of the sign brought into view, whereby the spring 106 is compressed and air drawn through the port 100 into the cylinder 99. The expansion of the spring will thereupon cause the piston to move backward at a rate of speed dependent upon the expulsion of the air through the port 100, the time period of which may be varied by means of the valve 101 and during which period the sign remains displayed.

When the piston reaches the limit of its inward movement the collar 104 will trip the lever 107, whereby through the connection 108 the latch holding the controller will be disengaged from the controller, thus retracting the locking pin to again start the motion of the operating mechanism. During the ensuing first half of revolution of the gear 86 the bar 110 is drawn back and the timing mechanism reset for action. Suitably supported in the path of the collar 104 is a spring controlled trip member 117. The lower end of this lever is arranged in the path of the sliding bar so as to be engaged and moved by said bar, in a direction toward the cylinder 99, when the bar reaches the limit of its inward movement.

As shown in Fig. 3 the trip member 117 is provided with a contact lug 117', against which the upper end of the lever 107 abuts, when said lever 107 is engaged by the collar 104 and held under the tension of spring 106 to draw on the cord 108 and retract the latch. When the bar 110 engages the trip member 117, the highest portion of the cam 95 passes under the adjacent end of the lever 91 to raise such end of the lever and tension the end 98 of the spring for projection of the bolt. At this time the collar 104 has not quite reached the limit of its travel and still holds the cord 108 under tension. The movement of the trip member 117 by the bar 110, however, causes the lug 117' to engage and tilt the upper end of the lever 107, against the tension of the spring 106, in the direction of motion of the trip member. By this action the lower end of the lever 107 engages and temporarily presses back the collar 104 against the pressure of spring 116, while the cord 108 is relaxed, allowing the latch 94 to engage under the lever 91 as its adjacent end is elevated by the cam 95, thus setting said lever for bolt projecting action. A main controlling or starting lever 118 is provided with a projecting arm 118' adapted for adjustment thereby to engage and hold the trip lever 107 from movement or to permit it to be tripped by the piston, whereby the apparatus may be thrown into and out of operation at will. In connection with the apparatus, an auxiliary circuit 119 containing a bell or other signal 120 may be employed, which circuit includes a switch 121 controlled by the piston stem in such a manner as to either close the circuit and sound the bell when the sign-bearing element is shifted or while the signs are being displayed.

In the use of the device as a street or station indicator for street or railway cars, suitable means may be provided at proper intervals along the track or main current conductor for controlling the starting and stopping devices of the sign mechanism, so that on passing one street or station the controlling lever of the starting mechanism will be tripped to release the gear 86 and close the motor circuit for shifting the sign to bring the name of the next street or station into view, the sign-bearing element then being locked at the proper interval and for a proper period to display the name of the next street or station.

From the foregoing description, taken in connection with the accompanying drawings, it will be apparent that the invention provides a compact type of changeable sign apparatus which may be used for either advertising or indicating purposes, which provides in an effective manner for the use of a traveling sign-bearing element and its reversal of movement and enables each sign to be displayed for a determined period, while providing a compact mechanism for the purpose.

Having thus described the invention, what I claim as new is:—

1. In an apparatus of the class described, the combination of a pair of spools, a sign-bearing element connected with the spools to wind on one and unwind from the other, driving means for the spools, clutches between said driving means and spools, devices for opening one and closing the other clutch simultaneously, means for normally holding and releasing one or the other of said devices, means controlled by the driving means for resetting said devices, and a motor for actuating the driving means.

2. In an apparatus of the class described, the combination of a pair of spools, a sign-bearing element connected with the spools to wind on one and unwind from the other, driving means for the spools, clutches between the said means and spools, devices for opening one and closing the other clutch simultaneously, means for holding said devices, means for shifting the same when released, means for releasing one or the other of said devices when the sign-bearing element is wound on one spool and unwound from the other, means actuated by the driving means for automatically resetting said devices, and a motor for operating said driving means.

3. In an apparatus of the class described, the combination of a pair of spools, a sign-bearing element connected with the spools to wind on one and unwind from the other, driving means for the spools, clutches between the said means and spools, a pair of clutch shifting levers, detents for holding the same from movement, means for releasing one or the other of said detents when the sign-bearing element has been wound upon one spool and unwound from the other, means for shifting either of the levers when released, means controlled by the levers for simultaneously opening one clutch and closing the other, means operated by the driving means for resetting the levers after actuation, and means for actuating said driving means.

4. In an apparatus of the class described, the combination of a pair of spools, a sign-bearing element adapted to wind upon one spool and from the other spool, driving means for said spools, clutches between the said driving means and spools, a pair of clutch shifting levers, means for normally holding the same from operation, means for releasing one or the other of said levers when the sign-bearing element has wound upon one spool and from the other, means for shifting either lever after release, means including a member operable by either lever for actuating the clutches, means operated by the driving means for resetting the levers after actuation, and a motor for actuating the driving means.

5. In an apparatus of the class described, the combination of a pair of spools, a sign-bearing element adapted to wind upon one spool and from the other spool, driving means for said spools, clutches between the said driving means and the spools, a pair of clutch shifting levers, detents for normally holding the same from action, means for releasing one or the other of said detents when the sign-bearing element has wound from one spool and upon the other, means for shifting either lever after release, means including a member movable by either lever for oppositely shifting the clutches, devices for resetting the levers, a common means operated by the driving means for actuating said resetting devices, and a motor for operating the driving means.

6. In an apparatus of the class described, the combination of a pair of spools, a sign-bearing element connected with and adapted to wind upon one spool and from the other spool, driving mechanism for the spools, a cut-out device for throwing the driving mechanism into and out of action, a latch for holding said device in cut-out position, a trip for releasing said latch and throwing the cut-out device into action, a fluid pressure retarded controller for actuating the trip, said controller being set for action by the driving mechanism to operate said trip after a predetermined interval, and means controlled by the driving means for resetting the cut-out device.

7. In an apparatus of the class described, the combination of a pair of spools, a sign-bearing element connected with and adapted to wind upon one spool and from the other spool, driving mechanism for the spools, a cut-out device for throwing the driving mechanism into and out of action, a latch for holding said device in cut-out position, a trip for releasing said latch and throwing the cut-out device into action, a fluid pressure retarded controller for actuating the trip, said controller being set for action by the driving mechanism to operate said trip after a predetermined interval, means for varying the time period of action of the fluid pressure retarded controller, and means controlled by the driving means for resetting the cut-out device.

8. In an apparatus of the class described, the combination of a pair of spools, a sign-bearing element connected with and adapted to wind upon one spool and from the other spool, driving mechanism for the spools, an electric motor for operating said driving mechanism, a circuit including said motor and having a cut-out switch, a cut-out device controlling said switch and the driving mechanism and adapted to simultaneously throw the same into and out of action, a latch for holding said cut-out device in switch-opening and drive mechanism releasing position, a trip device for retracting the latch, means including a fluid pressure retarded controller set for operation by the driving means for actuating said trip device after a predetermined period, and means operated by the driving mechanism for resetting said cut-out device.

In testimony whereof I affix my signature in presence of two witnesses.

HARRY O. BRION.

Witnesses:
IRVIN L. MILLER,
RICHARD W. BRION